Aug. 6, 1968

TOSHIO SAWADA 3,395,593

MECHANISM FOR SELECTING PATTERNS IN AN AUTOMATIC
PATTERN STITCH SEWING MACHINE

Filed July 11, 1966

Toshio Sawada,
Inventor

By Wenderoth, Lind and Ponack
Attorneys

FIG. 4  FIG. 5  FIG. 6  FIG. 7  FIG. 8
(a)
    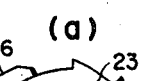
(b)
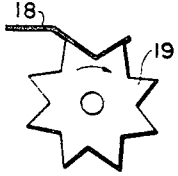 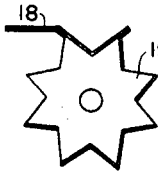 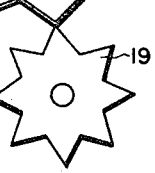 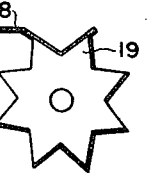 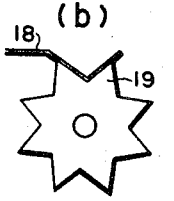
(c)
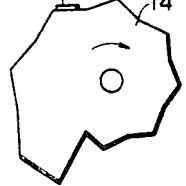   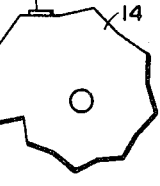 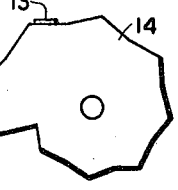
(d)
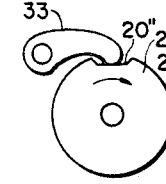  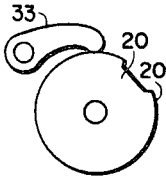 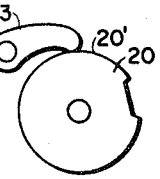 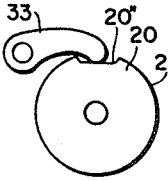
(e)
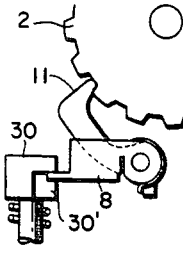 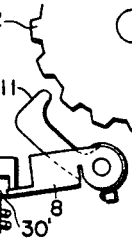 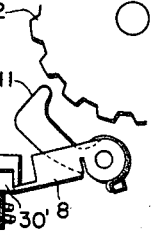 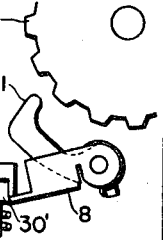 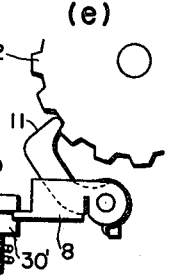

United States Patent Office 3,395,593
Patented Aug. 6, 1968

3,395,593
MECHANISM FOR SELECTING PATTERNS IN AN AUTOMATIC PATTERN STITCH SEWING MACHINE
Toshio Sawada, Kariya, Japan, assignor to Aisin Seiki Kabushiki Kaisha, Kariya, Aichi, Japan
Filed July 11, 1966, Ser. No. 564,170
Claims priority, application Japan, July 15, 1965, 40/58,090
2 Claims. (Cl. 74—569)

ABSTRACT OF THE DISCLOSURE

A mechanism for selecting a desired pattern cam from a pile of rotary zigzag pattern cams, which is so arranged that the cam follower or contact finger can be transferred not only step-by-step consecutively, but also may be transferred from one pattern cam to another pattern cam which is seperated from the one pattern cam by one or more intermediate pattern cams, passing by an intermediate undesired pattern cam or cams, by a simple manipulation of the selecting dial knob.

---

This invention relates to a mechanism for selecting the pattern in a pattern stitch sewing machine. In the conventional pattern stitch sewing machine, the pattern selecting mechanism has been so designed that the dial knob having the pattern marks has to be manipulated by step-by-step motion in such manner that the contact finger for selecting the desired pattern is moved from one pattern cam to next pattern cam, and so on. If, for example, there are four patterns, A, B, C and D, and assuming that the contact finger for the pattern cams is in engagement with the first pattern cam A, when it is desired to select the last pattern cam D, the dial knob must be manipulated step-by-step, from A to B, from B to C and then from C to D. Such manner of manipulation is very troublesome and smooth operation of the mechanism can not be expected. The object of the present invention is to provide an improved mechanism for selecting the pattern cams, in which the contact finger for the pattern cams can be held disengaged from the undesired pattern cam or cams during the selecting operation, so that in the above example the contact finger can be shifted from cam A direct to cam D, passing by the undesired cams B and C. Hence, the pattern dial knob can be readily and more smoothly manipulated. Other objects will appear from the following description and the accompanying drawings. In the drawings:

FIGURES 4 to 8 show the order of operation of the various parts forming the mechanism of the present invention.

Figure 2:
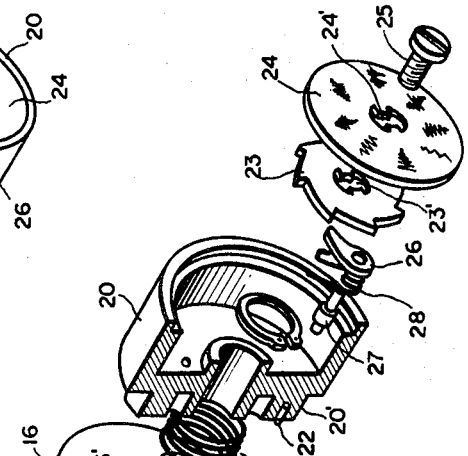
FIGURE 2 is a perspective view partly in section of one embodiment of the invention, said parts being shown as assembled.
Figure 1:
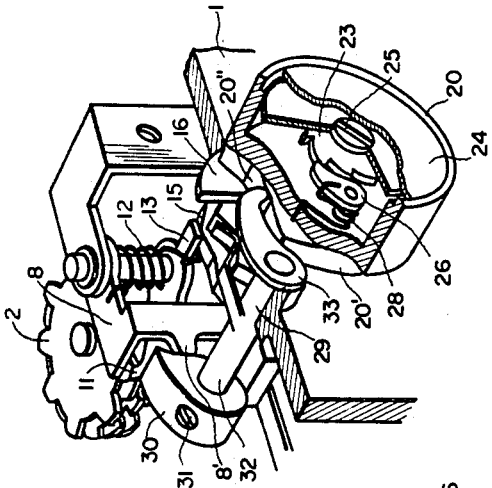
FIGURE 1 is an exploded perspective view of various parts forming the device according to the present invention.

Referring to the drawings, the reference numeral 1 designates a frame of a sewing machine head, and a plurality of piled up pattern cams are shown generally by the reference numeral 2 which cams are adapted to be rotated by means of a main shaft (not shown) of the sewing machine. An oscillatable bar 3 is associated with a needle bar bracket (not shown), and is normally biased in the direction of arrow A by means of a spring (not shown) connected with a needle bar arm (not shown). A roller 4 provided at an end of said bar 3 is engaged in a slot 6 provided in a width adjusting member 5. Said roller 4 is adapted to impart zigzag motion to the needle bar (not shown) according to the oscillation of the width adjusting member 5 around a vertical shaft 7. Said width adjusting member 5 and an intermediate arm 8 are connected by means of a screw 10 and a washer 9. A contact finger 11 is oscillatable around the shaft 7, and the rear edge thereof abuts against the intermediate arm 8 by means of a coil spring 12 which is wound around the shaft 7. When acted upon by the movement of the bar 3 in the direction of arrow A, said contact finger 11 is adapted to come into contact with the periphery of any selected one of a plurality of piled up pattern cams 2 against the action of said coil spring 12. Thus, the width adjusting member 5, the intermediate arm 8 and the contact finger 11 are oscillated in unison around the shaft 7. Said spring 12 also serves to press down the contact finger 11, so that a projection 13 provided at the other end of the contact finger 11 is normally held in contact with the cam surface 15 of the contact finger feed cam 14. Said feed cam 14 is fixed to one end of a cam shaft 17 which is loosely mounted on the frame 1 through a bearing member 16. A leaf spring 18 secured to the frame 1 has at its free end a V-shaped bent portion 18' which is adapted to engage with peripheral grooves of a star wheel 19 provided on the back of the said contact finger feed cam 14, so that the feed cam 14 is stopped at any angle of rotation. On the base portion 16' of said bearing member 16, there is loosely mounted a dial knob 20 which is normally biased to be rotated in a counterclockwise direction by means of a spring 21. The rotation of said dial knob 20 in the counterclockwise direction is limited by means of a pin 22 adapted to abut against the edge 16'' of an arcuate recess provided in the flange of the bearing member 16. The circumferential dimension of said arcuate recess is preferably an angle of 180°. A ratchet wheel 23 and a pattern indicator disc 24 have central bores having projections 23' and 24', respectively, which are mounted upon the cam shaft 17, with said projections 23' and 24' engaging with a recess 17' formed at the extreme end of the shaft 17, and the parts are fixed by means of a screw 25, so that said parts are adapted to be moved in unison with the contact finger feed cam 14. A pawl 26 pivoted at a pin 27 is normally held engaged with said ratchet wheel 23 at the position between two ratchet teeth, by means of a spring 28.

Figure 3:
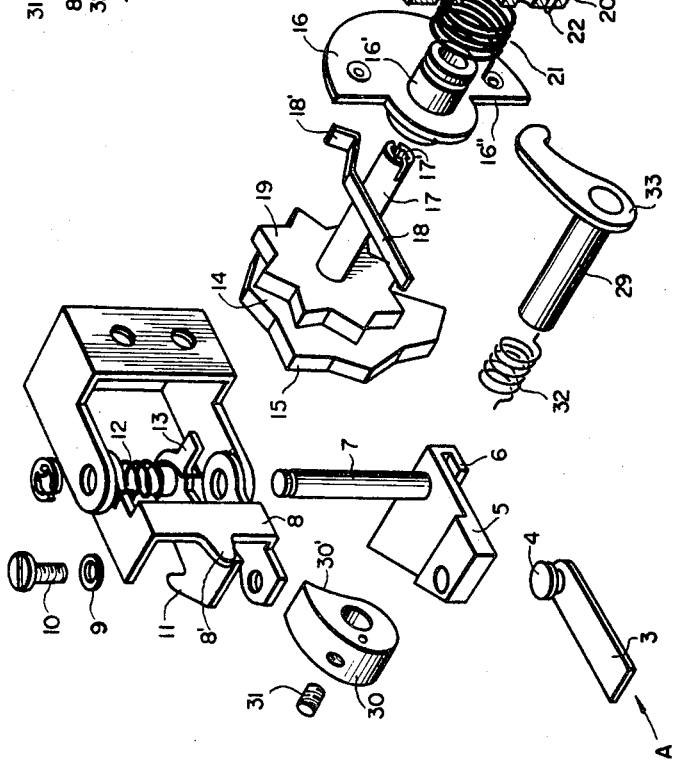
FIGURE 3 is a perspective view on an enlarged scale of the contact finger releasing cam.
Figure 3:
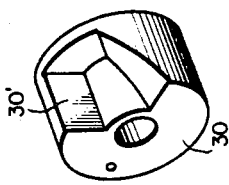

A horizontal shaft 29 journaled in the frame 1 has at its one end a releasing cam 30 secured thereto by means of a set screw 31, and at its other end there is fixed a contact finger releasing cam 33 which has a tendency to rotate in the clockwise direction by means of a spring 32 wound around the shaft 29 and connected between the releasing cam 30 and the frame 1. As shown in FIGS. 2, 3 and 4, the releasing cam 30 has a cam portion 30' which is in engagement with the lateral projection 8' of the intermediate arm 8. By the action of the spring 32, the releasing arm 33 is in engagement with a lifting cam 20' formed on the back of the dial knob 20.

The cam portion 30' of the releasing cam 30 engaging with the projection 8' of the arm 8 is so designed that the intermediate arm 8 is rotated around the axis of the shaft 7 in the counterclockwise direction upon the rotation of the releasing arm 33 in the same direction as viewed from the top of the sewing machine.

Now, the operation of the present device will be described with reference to FIGS. 4 to 8. Assuming that it is desired to change-over the pattern stitch from one pattern to next pattern, when the dial knob 20 is rotated in the clockwise direction against the action of the spring 21 in order to shift one pattern mark to the next pattern mark relative to a co-operating indicator mark (not shown) provided on the frame 1, the cam face 20' on the dial knob will actuate the contact finger releasing arm 33 in the counterclockwise direction, thereby the associated releasing cam 30 will be turned in the same direction against the action of the spring 32, so that the intermediate arm 8 will be rotated in the counterclockwise direction as viewed from the top of the sewing machine, being acted upon by the cam portion 30' of the contact finger releasing cam 30. Thus, the contact finger 11 connected to the spring 12 will be moved away from the pattern disc cams to a position beyond the maximum diameter of the pattern disc cams 2. At this time, the releasing arm 33 is in the low portion 20" (small diameter portion) of the cam 20' on the dial knob 20, as shown in FIG. 4 (d). Upon further rotation of the dial knob 20 in the clockwise direction, the pawl 26 will come to engage with one tooth of the ratchet wheel 23 and will feed one pitch of said tooth (FIGS. 5 and 6), thereby the contact finger feed cam 14 fixed on said ratchet wheel will also be turned, so that the contact finger 11 will be shifted to next pattern cam against the action of the spring 12. Now, if the actuation of the dial knob 20 is stopped, the pin 22 will abut against the edge 16" of the recess in the flange of the bearing member 16 by the action of the springs 21 and 32, thereby the contact finger releasing cam 20" and the releasing cam 30 will return to their initial position (FIG. 8). When it is desired to utilize another pattern cam, instead of the next one, by shifting the contact finger 11 passing over one or more pattern cams, the dial knob 20 can be accordingly rotated in the clockwise direction. Even with such operation, the contact finger 11 can be shifted while passing over the intermediate pattern cam or cams without any hinderance, because the contact finger 11 is held in the position beyond the maximum diameter of the pattern cams. Thus, the operator can continue the rotation of the dial knob 20 until the desired pattern mark on the dial knob comes in register with the co-operating indicator mark on the frame.

From the foregoing, it will be seen that according to the present invention by a simple manipulation of the dial knob the contact finger shifting cam and the releasing cam associated therewith can be readily actuated, and that the contact finger can be shifted beyond the maximum diameter of the pattern cams during the pattern cam selecting period, so that the contact finger can pass by one or more pattern cams without contacting the same, enabling more smooth operation of pattern selection.

What I claim is:
1. In an automatic pattern stitch sewing machine having a plurality of piled up pattern cams adapted to be rotatably driven from the main shaft of the machine, the combination of a contact finger adapted to be coupled to a needle bar and to engage the periphery of a selected one of said pattern cams for transmitting the pattern motion to the needle bar, a mechanism coupled to said contact finger for moving the finger for selecting a pattern cam among the piled up pattern cams, said mechanism comprising a selecting dial knob, a releasing cam engageable with said contact finger for moving said contact finger from a position in which it engages the pattern cams to a position beyond the maximum diameter portion thereof, cam actuating means coupled to said dial knob and said releasing cam and actuating the releasing cam by initial rotation of said dial knob to move said contact finger away from said pattern cams and hold the contact finger in the disengaged position during the succeeding rotational movement of said dial knob, and contact finger moving means coupled between said knob and the contact finger for moving the released contact finger along the piled up pattern cams to a desired pattern cam by the succeeding rotational movement of said dial knob.

2. The combination as claimed in claim 1 in which said releasing cam is a rotatable cam and said cam actuating means comprises an actuating cam connected to said dial knob for rotation therewith and a cam follower engaged with said actuating cam for rotation thereby when said actuating cam is rotated by said dial knob and coupled with said releasing cam for rotating said releasing cam when the cam follower is rotated by the actuating cam, said actuating cam having a cam profile for initially rotating the cam follower and then holding it in the rotated position.

References Cited
UNITED STATES PATENTS

| | | | |
|---|---|---|---|
| 2,971,482 | 2/1961 | Koike | 112—158 |
| 3,053,207 | 9/1962 | Adler | 112—158 |
| 3,067,702 | 12/1962 | Shimada | 112—158 |
| 3,118,404 | 1/1964 | Reeber et al. | 74—569 X |
| 3,148,645 | 9/1964 | Aiki et al. | 74—569 X |

FRED C. MATTERN, JR., *Primary Examiner.*

F. D. SHOEMAKER, *Assistant Examiner.*